Figure 1:
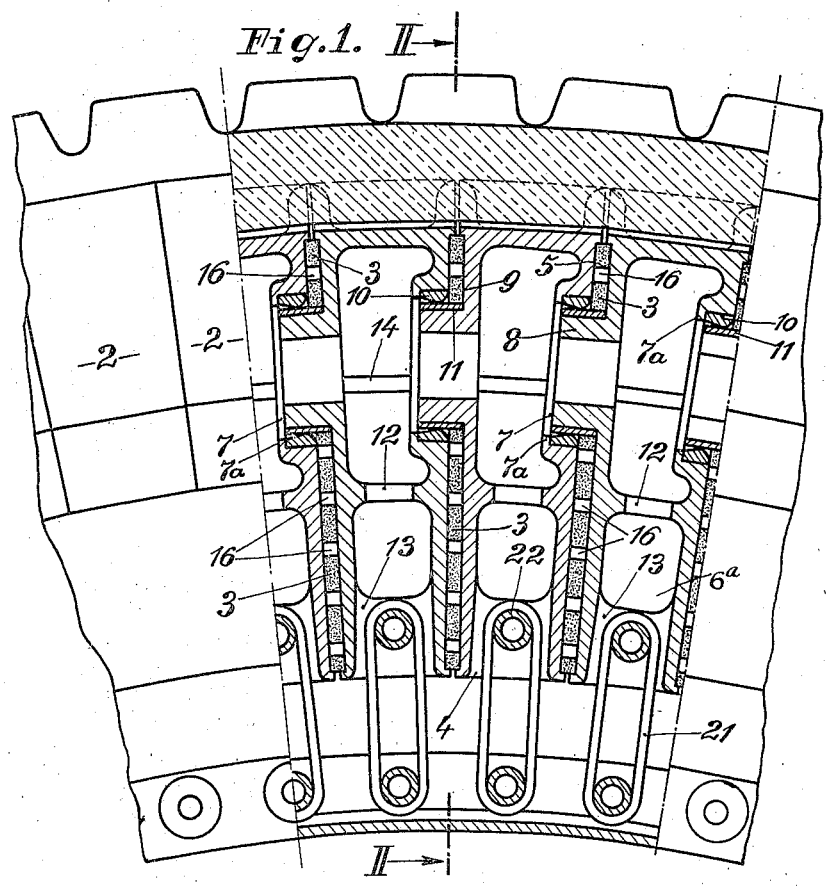

Apr. 24, 1923.

R. VON KRENSKI

VEHICLE TIRE

Filed Jan. 24, 1922

1,453,033

2 Sheets-Sheet 1

Inventor:
Roman von Krenski
by
Attorney.

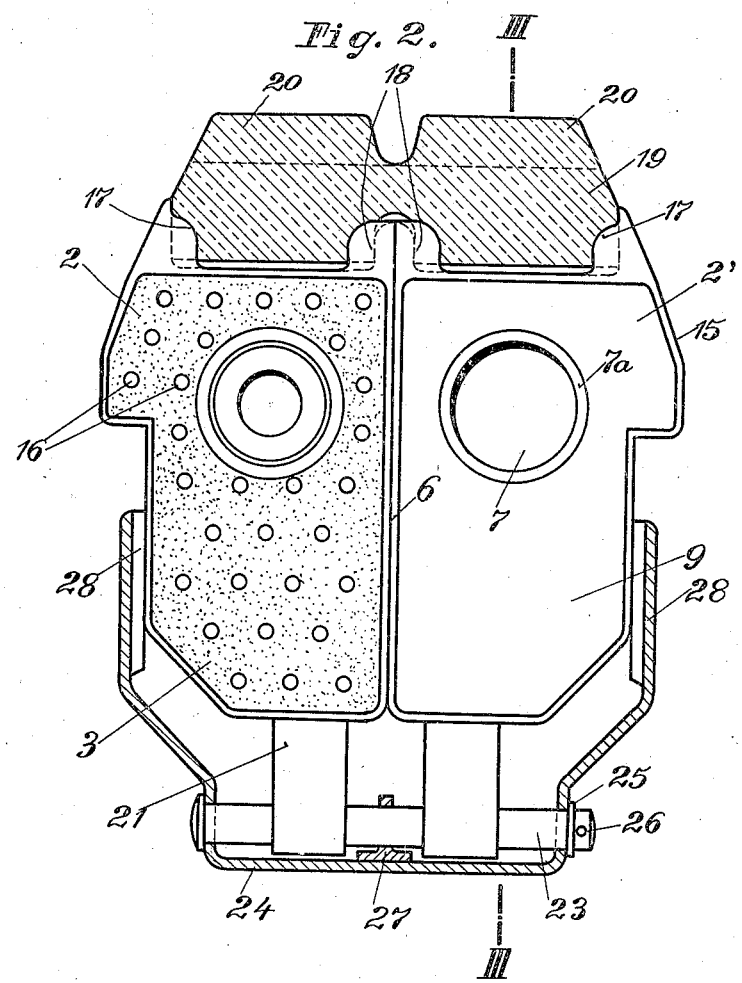

Patented Apr. 24, 1923.

1,453,033

UNITED STATES PATENT OFFICE.

ROMAN von KRENSKI, OF BERLIN-FRIEDENAU, GERMANY.

VEHICLE TIRE.

Application filed January 24, 1922. Serial No. 531,459.

*To all whom it may concern:*

Be it known that I, ROMAN VON KRENSKI, a citizen of Germany, residing at Berlin-Friedenau, Germany, have invented certain new and useful Improvements in Vehicle Tires (for which I have filed applications in Germany April 11, 1919, January 10, 1921), of which the following is a specification.

My invention relates to vehicle tires designed to form a substitute for rubber tires.

It has already been proposed to make tires comprising a plurality of resilient and rigid segments alternating with one another in order to impart to the tire radial compressibility and tangential resiliency, the said segments being combined to form a self-contained annular structure which is placed on the rim at considerable tension and secured to it by means of pivoted links thus preventing its parts from separating.

All these tires, however, involve serious drawbacks causing them to be destroyed after a short time. This is principally due to the fact that the segments are heated in operation to such an extent that the resilient segments as well as the rigid ones—which mostly consisted of wood—are burned or damaged so as to get unfit for service. This is due to the fact that in all these tires practically no means were provided for cooling the segments.

In order to overcome these drawbacks, I employ segments in the shape of hollow bodies open at three or four sides, such segments being made of metal or some other material which is a good conductor of heat. Furthermore the non-elastic connecting members intermediate the segments which are designed to prevent independent radial movement have the form of tubes secured to or tubular extensions integral with arranged on one side of the segments, so that an annular air chamber is formed in the tire. The air in this chamber having strong and sudden impulses imparted to it by the continuously varying circumferential velocity of the wheel when running, exerts a very energetic cooling effect on the inner walls of the segments. Accumulation of heated air in the parts of the segments adjoining the circumference of the tire is also prevented.

As the tubes or tubular extensions of the segments are subjected to considerable stresses in operation, while, on the other hand, permitting the segments to perform independent oscillations in a tangential direction, they are provided with sleeves, preferably made of steel, and the holes of the segments in which the extensions are inserted, are provided with steel rings or the like which are spherical or otherwise chamfered at the surfaces where they are engaged by said sleeves. As the rings and sleeves are in contact only along a line, the segments are free to move in relation to one another while at the same time the wear is reduced to a minimum, the friction being insignificant. Obviously, any other means may be provided instead of the sleeves and rings, such means acting for instance after the manner of ball or roller bearings or the like.

The use of metal segments affords several other advantages. Thus the lateral walls of the metal segments between which the resilient segments are inserted, may be provided with a continuous flange at their edges so that on the outside of the tire there is left only a small interstice between the metal segments so that the resilient segments cannot be forced out of the tire by the continuous compression. The arrangement of the resilient segments in chambers closed on all sides involves the drawback that they tend to assume a larger section under compression than is permitted by the flanges surrounding the chambers in which the resilient segments are placed. Moreover the stresses placed under compression on these segments, which are preferably made of rubber, act on their molecules, so that the structure of the rubber would soon be destroyed by the action of heat and other influences. This is prevented according to the present invention by providing perforated rubber plates, thus reducing the volume of the plates, while their thickness remains unaltered and they are able to yield under compression without their outer circumference increasing and without the rubber protruding between the rigid segments.

As roads are never perfectly even, there is the danger of a pressure being exerted on the segments which is not directly exactly radially but at an angle to the plane of the wheel. This will cause the segments to rock so that they may be forced out of the tire. I prevent this in a preferred construction of my improved tire by dividing the rigid segments in a central plane of the wheel at right angles to the axle, so that the tire consists of pairs of adjacent segments. In this manner two adjacent tires are formed each of which is constructed in the manner described, both tires being free to move radially independently of one another. Such a tire is more resilient than an undivided one as each half of the tire deadens the shocks independently and the resilient segments, which are only half the size as they would be in an undivided tire, are more readily compressed under the action of shocks. The securing of the tire to the rim is much simplified by using metal (!) segments.

As the rigid segments can be made of light metals such as aluminium or an alloy of aluminum and magnesium a considerable saving in weight is effected, the weight of the tire being substantially equal to that of a rubber tire. Thus the weight of a tire comprising 80 pairs of an alloy of aluminum and magnesium segments and having the standard diameter of 32¼", is about 27 lbs., including the resilient segments.

My novel tire is so constructed that its outside is perfectly even and unbroken after assembling.

Figure 3:
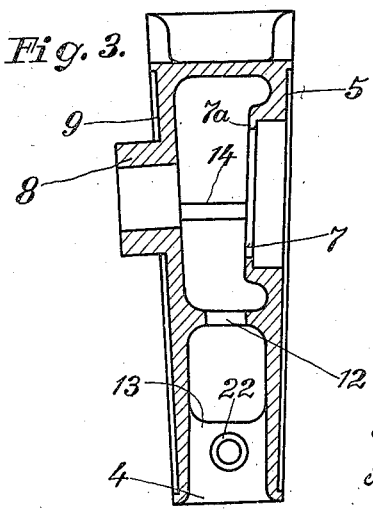

In the drawings affixed to this specification and forming part thereof, a device embodying my invention is illustrated diagrammatically by way of example. In the drawings Fig. 1 is an elevation, partly in longitudinal section, Fig. 2 is a section on line II—II of Fig. 1, and Fig. 3 is a section of one of the rigid segments, on line III—III of Fig. 2.

The tire comprises non-resilient segments 2 and resilient segments 3, for instance made of rubber, which are arranged in alternating succession so as to form an annular structure. The rigid segments may be made of aluminium, an alloy of aluminium and magnesium or some other light metal or other material which is a good conductor of heat.

The segments are hollow bodies open at the end 4 facing the wheel centre and provided with openings 6ª and 7 in their lateral walls 6 and their end walls 5, respectively, so that air is free to circulate around the walls of every segment. The opening 7 in the end wall 5 of the segments is adapted to receive a tubular extension 8 formed on the end wall 9 of the adjoining segment. The object of these extensions 8 is to prevent independent radial movement of the segments. However, as some play between the segments must be provided, as otherwise the resilient segments 3 could not be compressed, rings 10, preferably made of steel, are inserted in the openings 7, its inner surface of said rings being curved axially. A sleeve 11, preferably also consisting of steel, is secured on each tubular extension 8 which fits into the ring 10. The segments 2 are provided with bracing webs 12, 13 and 14. At the inner end of the opening 7 a flange 7ª is provided.

The end walls 5 and 9 of the segments are provided with a projecting flange 15 which extends over the entire circumference of the segments so that an almost closed chamber is formed between two adjoining segments. The resilient segments 3 are inserted in these chambers. In order to prevent excessive heating or protruding of the resilient segments 3, the latter are provided with hollow spaces or perforations 16.

By the described hollow and open construction of the segments 2 and the tubular form of the extensions 8, I obtain a continuous hollow annulus extending over the entire circumference of the tire. The air contained in this hollow annulus cools the inner surfaces of the segments. This cooling action is very effective, as the air is maintained in permanent motion owing to the continually varying circumferential velocities of the wheel. The whirling of the air is increased by the fact that the air annulus is connected with the interior of the rim through the openings 4 of the segments 2. The circulation of the air also prevents the accumulation of heated air in the parts of the segments 2 near the circumference of the tire.

In order to prevent rocking of the segments when lateral forces are acting thereon, the rigid as well as the resilient segments are divided in the central plane of the wheel so as to form two segments 2 and 2' which abut by their lateral walls 6. The contact surfaces of the walls 6 are perfectly plane, so as to enable the adjacent segments 2 and 2' to move radially in relation to one another. Each segment is provided with means for securing it to the rim, as will be described further below.

Each segment is provided with lugs 17 and 18 having hemispherical faces for holding a solid rubber tread 19 which fits the said lugs by means of recesses. This tread 19 is secured to the tire formed by the segments 2, 2' and 3 after the latter has been assembled. The tread 19 is provided with antiskidding devices 20. The engagement of the tread 19 with the lugs 17, 18 prevents creeping of the tread without interfering with the independent movement of the segments.

The tire is secured to the rim by links 21 which engage pins 22 of the segments and pins 23 of the rim 24 and may be tubular. The pins 23 are inserted from the outside of the rim 24 and held in position by washers 25 and dowel pins 26. A ring 27 of T-section is arranged at the centre of the rim 24 in which the pins 23 are secured. The rim is provided with lateral packings 28 which surround the tire so tightly that no dirt can enter the open interior of the tire, nor can moisture collect in it. As the links 21 are entirely concealed in the rim, they cannot be damaged by contact with the road, curbstones or the like. Auxiliary perforations may be provided in the rim when necessary, in order to assist the circulation of air in the tire.

The tire is assembled as follows: After the segments 2, 2' and 3 have been assembled, they are compressed by a tension device acting on the outside of the tire, until the bolts 23 can be inserted. Thereafter the tread 19 is placed on the tire.

Obviously the novel tire is capable of operating exactly as a rubber tire, being adapted to be compressed in a radial direction and to move in a tangential direction in relation to the rim. As compared with rubber tires, it involves the advantages of longer life, greater reliability, facilitated repairs and better resilience. This latter advantage is also due to the fact that the forces acting on the tire are automatically transmitted to the diametrically opposite parts of the tire and are uniformly distributed over the tire by the links 21.

I wish it to be understood that I do not desire to be limited to the exact details of construction shown and described, for obvious modifications will occur to a person skilled in the art.

I claim:

1. In a vehicle tire in combination, elastic and non-elastic segments extending substantially in radial planes comprising the wheel axis, said segments alternating with one another and being combined into an annulus placed under preliminary tension, the non-elastic segments having the form of hollow bodies open on three sides.

2. In a vehicle tire in combination, elastic and non-elastic segments extending substantially in radial planes comprising the wheel axis, said segments alternating with one another and being combined into an annulus placed under preliminary tension, the non-elastic segments having the form of hollow metallic bodies open on both sides and toward the centre of the annulus.

3. In a vehicle tire in combination, elastic and non-elastic segments alternating with one another and combined into an annulus, the non-elastic segments having the form of hollow bodies open on both sides and towards the centre of the annulus and tubular connections between the side openings of adjoining segments.

4. In a vehicle tire in combination, elastic and non-elastic segments alternating with one another and combined into an annulus placed under preliminary tension, the non-elastic segments having the form of hollow bodies open on both sides and towards the centre of the annulus, tubular connections between the side openings of adjoining segments and stiffening webs within said segments.

5. In a vehicle tire in combination, elastic and non-elastic segments alternating with one another and combined into an annulus, the non-elastic segments having the form of hollow bodies open on both sides and towards the centre of the annulus and a tubular extension surrounding the opening on each side of each segment, one extension being directed outwardly, the other inwardly.

6. In a vehicle tire in combination, elastic and nonelastic segments alternating with one another and combined into an annulus, the non-elastic segments having the form of hollow bodies open on both sides and towards the centre of the annulus, a tubular extension surrounding the opening on each side of each segment, one extension being directed outwardly, the other inwardly, a steel lining on said outwardly directed extension and a steel lining of convex section in said inwardly directed extension.

7. In a vehicle tire in combination, elastic and non-elastic segments alternating with one another and combined into an annulus, the non-elastic segments having the form of hollow bodies open on three sides and a projecting flange surrounding each lateral face of each non-elastic segment.

8. In a vehicle tire in combination, elastic and non-elastic segments alternating with one another and combined into an annulus, the non elastic segments having the form of hollow bodies open on three sides and the elastic segments being perforated.

9. In a vehicle tire in combination, elastic and non-elastic segments alternating with one another and combined into an annulus, said non-elastic segments consisting of two parts each part having the form of a hollow body open on three sides.

10. In a vehicle tire in combination, elastic and non-elastic segments extending substantially in radial planes comprising the wheel axis, said segments alternating with one another and being combined into an annulus placed under preliminary tension, the non-elastic segments having the form of hollow bodies open on three sides and means for linking each segment to a rim.

In testimony whereof I affix my signature.

ROMAN von KRENSKI.